United States Patent
Sollazzo

(10) Patent No.: US 8,523,014 B2
(45) Date of Patent: Sep. 3, 2013

(54) PRECISION MEASUREMENT DISPENSER

(76) Inventor: Nicole Sollazzo, New York, NY (US)

(*) Notice: Subject to any disclaimer, the term of this patent is extended or adjusted under 35 U.S.C. 154(b) by 1159 days.

(21) Appl. No.: 12/399,789

(22) Filed: Mar. 6, 2009

(65) Prior Publication Data

US 2010/0001019 A1    Jan. 7, 2010

Related U.S. Application Data

(60) Provisional application No. 61/034,277, filed on Mar. 6, 2008.

(51) Int. Cl.
| | |
|---|---|
| *G01G 13/00* | (2006.01) |
| *G01G 13/18* | (2006.01) |
| *B67D 7/06* | (2010.01) |
| *G01F 11/20* | (2006.01) |
| *B65B 1/30* | (2006.01) |

(52) U.S. Cl.
USPC ............ 222/77; 222/412; 222/185.1; 222/27; 141/83; 177/105

(58) Field of Classification Search
USPC ................... 222/181.1, 181.5, 412, 413, 333, 222/77, 55, 14, 23, 25, 26, 27, 28; 177/105, 177/145, 149, 160; 141/83, 94, 256
See application file for complete search history.

(56) References Cited

U.S. PATENT DOCUMENTS

| | | | | |
|---|---|---|---|---|
| 4,193,116 | A * | 3/1980 | Funk | 702/23 |
| 4,852,028 | A * | 7/1989 | Korpela et al. | 700/305 |
| 6,056,027 | A * | 5/2000 | Patterson | 141/370 |
| 6,336,573 | B1 * | 1/2002 | Johanson | 222/412 |
| 7,614,429 | B2 * | 11/2009 | Pluvinage et al. | 141/5 |
| 7,980,277 | B2 * | 7/2011 | Amano | 141/83 |
| 2001/0027823 | A1 * | 10/2001 | Luchinger | 141/83 |

* cited by examiner

*Primary Examiner* — Kevin P Shaver
*Assistant Examiner* — Stephanie E Williams
(74) *Attorney, Agent, or Firm* — The Marbury Law Group, PLLC

(57) ABSTRACT

A storage dispensing unit provides for storage of a granular bulk material in a hermetic storage container. The granular material is held in a storage container which feeds a dispensing section. The dispensing section selectively dispenses the ingredient downward to a base, which optionally includes a weighting tray of a scale. The ingredient is dispensed by weight. The storage dispensing unit may also include a display and keypad for entry of a desired quantity of ingredient to be dispensed, and optionally which of plural ingredients to be dispensed. A controller can convert a requested volumetric measure to an equivalent weight measure, and dispense by weight in place of volume. The storage dispensing unit further optionally includes pressure control on the storage container, i.e., vacuum, an maintains a hermetic seal when not actively dispensing. Optionally, temperature may also be controlled to enhance the shelf life of the stored ingredient.

16 Claims, 8 Drawing Sheets

PRECISION MEASUREMENT DISPENSER

CROSS-REFERENCE TO RELATED APPLICATIONS

This application claims the benefit under 35 U.S.C. §119 (e) of U.S. Provisional Patent Application Ser. No. 61/034,277, filed Mar. 6, 2008, entitled PRECISION MEASUREMENT DISPENSER by the present inventor, the entire disclosure of which is hereby incorporated by reference for all purposes.

BACKGROUND

1. Field

The present disclosure relates to the field of food preparation, and more particularly to an apparatus for the bulk storage and precision metered dispensing of granular food ingredients.

2. Description of the Related Art

Food preparation often involves using basic ingredients that are in granular form, e.g., flour of various types and origins, sugar of various types and origins, baking soda, baking power, ground spices, powdered seasonings, or the like. Traditionally, granular ingredients are measured by volume, and many or even most recipes are written accordingly.

However, it is known that measuring recipe ingredients by volume has drawbacks. For example, the ingredients may settle during storage, or may be loaded differently into the measuring vessels be different individuals, and accordingly the density will change. Therefore, equal volumes of an ingredient may have different masses, affecting the precision of the preparation.

SUMMARY

It is an object of the present disclosure to overcome these and other deficiencies in the known art. Therefore, the present disclosure provides a storage dispensing unit for storage of a granular bulk material in a hermetic storage container. The granular material is held in a storage container which feeds a dispensing section. The dispensing section selectively dispenses the ingredient downward to a base, which optionally includes a weighing tray of a scale. The ingredient is dispensed by weight. The storage dispensing unit also may include a display and keypad for entry of a desired quantity of ingredient to be dispensed, and optionally, which of plural ingredients to be dispensed. A controller can convert a requested volumetric measure to an equivalent weight measure, and dispense by weight in place of volume. The storage dispensing unit further optionally includes pressure control on the storage container, i.e., vacuum, and maintains a hermetic seal when not actively dispensing. Optionally, temperature may also be controlled to enhance the shelf life of the stored ingredient.

BRIEF DESCRIPTION OF THE DRAWINGS

These and other features and advantages will become apparent from the following description of the disclosure which refers to the accompanying drawings, wherein like reference numerals refer to like structures across the several views, and wherein.

DETAILED DESCRIPTION OF THE EMBODIMENTS

Figure 1:
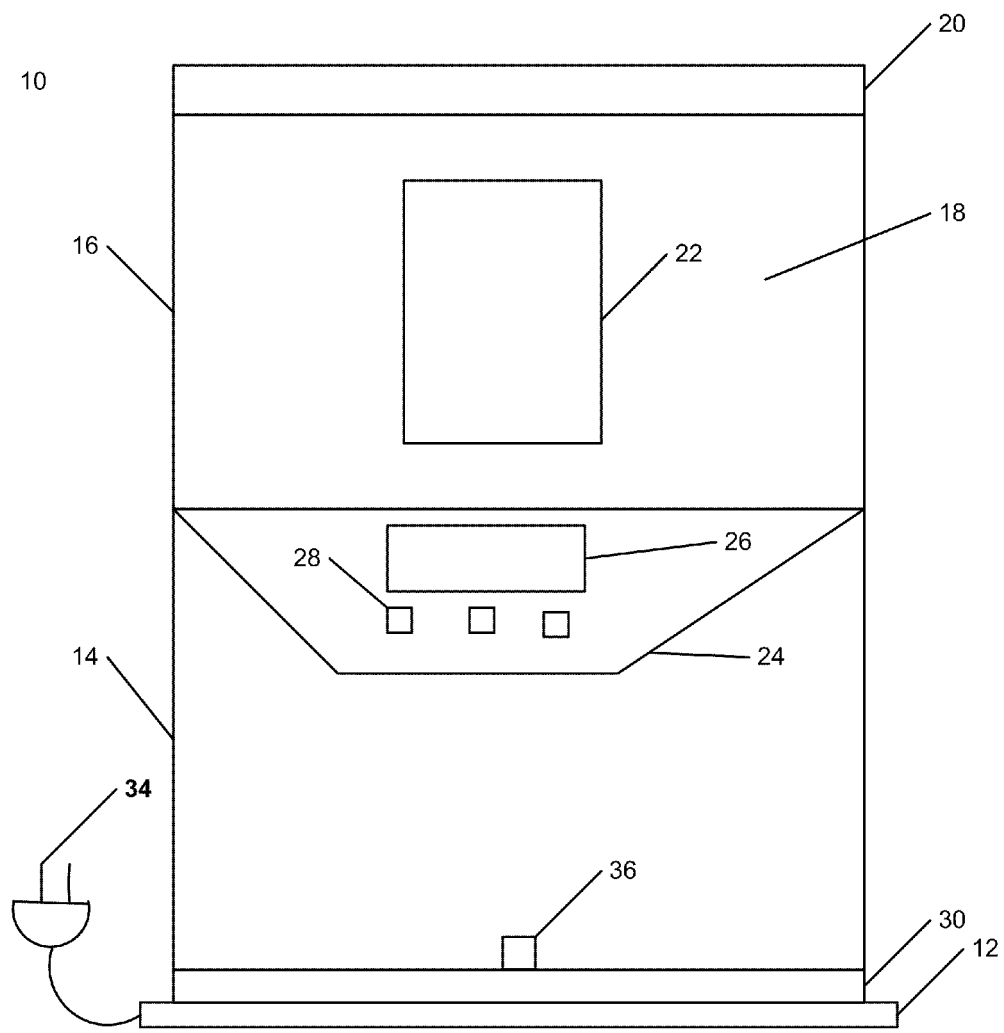
FIG. 1 illustrates a storage dispenser unit according to an exemplary embodiment of the present disclosure in front elevation view.
Figure 2:
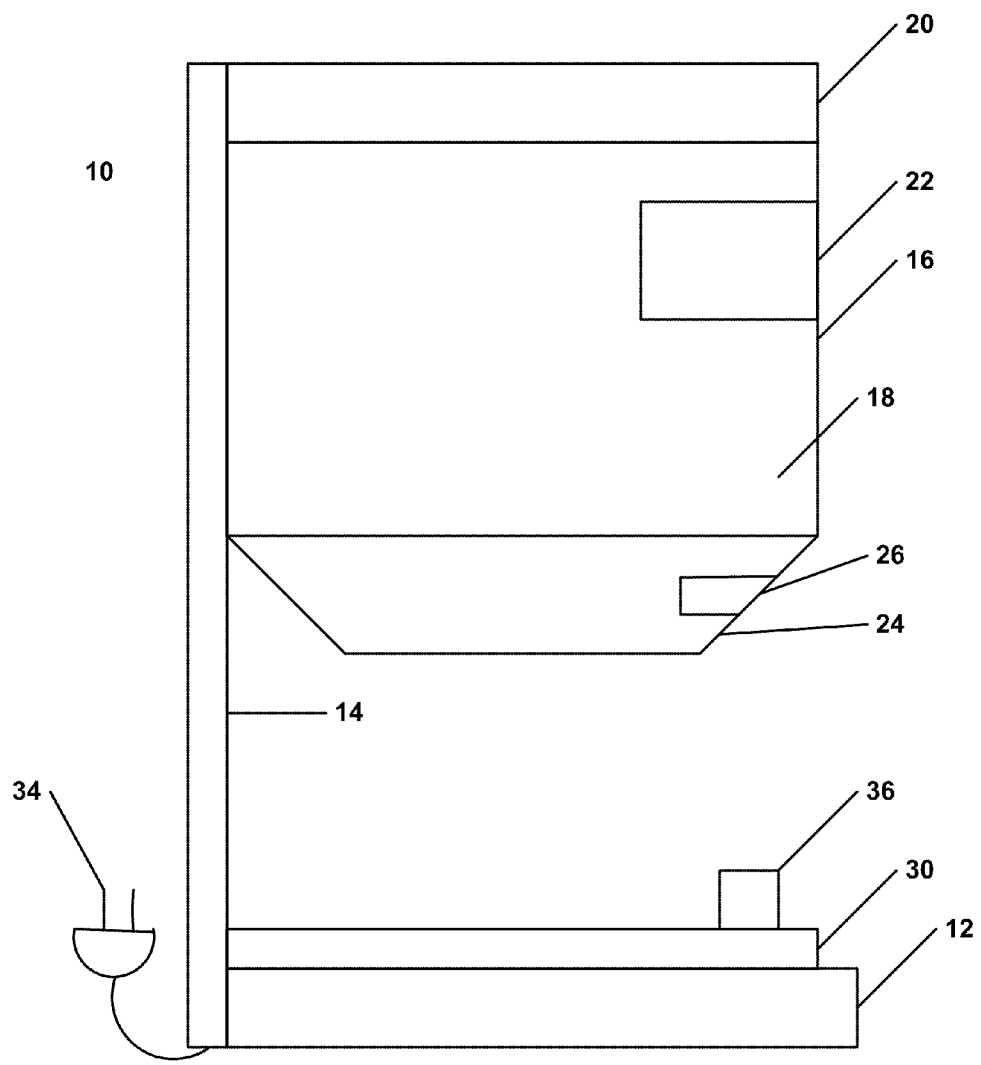
FIG. 2 illustrates the storage dispenser unit of FIG. 1 in a side elevation view.

Provided according to the present disclosure is a storage dispenser unit, generally 10, for a bulk granular product. We refer herein to flour as the exemplary ingredient merely as convenience, however it will be appreciated by those skilled in the art that the present disclosure is applicable to any granular substance. Storage dispenser unit 10 includes a base 12 at its bottom, and a stand 14 rising from the base 12. The stand 14 supports a canister 16 above the base 12. In a further embodiment the stand 14 is collapsible to reduce the height of the storage dispenser unit 10 when it is not in use. Alternately or additionally the canister 16 and/or the stand 14 may be detachable from the stand 14 and/or the base 12, respectively, also to facilitate storage.

The canister 16 includes a storage compartment 18, sealed by cover 20. The seal of cover 20 is preferably hermetic, yet releasable. Optionally a translucent or transparent window 22 is provided in the storage compartment 18 to permit visual determination of the contents of the storage compartment 18, i.e., their type and/or quantity. Alternately or additionally the storage compartment itself is transparent or translucent to permit the visual identification.

Beneath the storage compartment 18 is a dispensing section 24. The dispensing section receives the stored bulk goods from the storage compartment 18 above and selectively dispenses them below in the direction of the base 12. Provided on the dispensing section 24 are a display 26, and keypad 28, although either or both may be located elsewhere on the storage dispenser unit 10, or even remote from it. A power cord 34 connects with an external electric source to provide power as necessary to the storage dispenser unit 10. Alternately or additionally, electric power as needed would be sourced from internal batteries, solar panels or other available means.

Flour is commonly sold in retail quantities of 5 lbs. Therefore in one embodiment, storage compartment 18 is preferably sized to accommodate approximately 5 lbs. (2286 g) of flour, or at a common equivalent volume of 0.826 lbs. per 3 cups for all-purpose flour, approximately 18.2 cups (262.2 cubic inches; 4.296 liters). Additional space may be provided as a matter of convenience. Other sizes may be chosen as desired, or derived for contents other than flour, or for other applications.

The base 12 includes a surface that can support a vessel 32 to receive the dispensed material. In one embodiment, the base includes a scale (not shown) having a weighing tray 30. For the embodiment described above adapted to store and dispense 5 lbs. of flour, the scale preferably has a resolution of one-eighth (0.125) oz. (1 g), preferably smaller than the smallest amount to be dispensed, and a maximum capacity of 4 lbs. (1.8 kg), preferably larger than the largest amount to be dispensed. The weight on the weighing tray may be displayed on the display 26. Optionally, the displayed weight can be converted between English and metric units. The weighing tray 30 is preferably removable, for example for cleaning, and preferably is constructed of stainless steel.

The storage dispenser unit also includes a controller (not shown) which receives data input via the keypad or another means, and receives data from the scale. The controller directs the operation of the dispensing section 24 and/or the display 26. in a common mode of operation, the user would place a vessel 32 on the weighing tray 30 beneath the dispensing section 24. The scale would measure the weight of the vessel 32 before dispensing as the tare. Tare may also be manually set by the user depressing button 36 with the vessel 32 in place on the weighing tray 30. Tare button is 36 positioned in the exemplary embodiment on the base 12, but may also be located elsewhere on the storage dispenser unit 10, or remote from it.

Using the keypad 28, the user would enter a quantity and units to be dispensed, and in some embodiments, the type of ingredient to be dispensed. Moreover, the controller can accept any desired quantity given in commonly used volumetric units, and by use of a stored conversion factor, lookup table, or similar tool, convert to weight measure and dispense according to an equivalent weight. The keypad optionally has dedicated confirmation means, for example a single-purpose 'dispense' button. or a multi-purpose button to be depressed at an appropriate time, to confirm that dispensing is to begin, in order to avoid inadvertent dispensing without an appropriate vessel 32 in place to receive the ingredient. It will be noted that the particular order of steps described above may be altered without departing from the scope of the present disclosure.

Having received a desired quantity (and optionally type) of ingredient, the controller activates the dispensing section 24 to release the desired quantity. The controller receives feedback via the weighting tray 30 of the scale as to the weight of ingredient dispensed. The rate of dispensing can be controlled to prevent over-dispensing the selected ingredient due to feedback delays at the scale, controller, and/or dispensing section 24. The controller further optionally includes storage to store certain present quantities of one of more ingredients, i.e., recipes, which can be recalled through the keypad 28 and dispensed in a consolidated operation.

In another embodiment, the function of weighing the ingredient for dispensing the selected quantity is accomplished internally to the dispensing section 24. In this embodiment the dispensing section 24 weighs certain quantity of the ingredient internally, and dispenses the weighed amount below itself. In this embodiment, the scale to confirm the accuracy of the quantity dispensed is internal to the dispensing section 24, and the weighing occurs before the ingredient is released from the dispensing section 24. In this embodiment, the scale and weighing tray 30 may be provided as well, for the convenience of the user. Additionally, they may be incorporated into the dispensing process as a verification of the dispensed quantity.

As noted above, cover 20 preferably maintains a hermetic seal of the storage compartment 18, to preserve the freshness of the food ingredient stored therein. Optionally, once sealed, a vacuum may be applied to the storage compartment, for example by an internal vacuum pump (not shown) to help maintain the freshness of the stored ingredient. More preferably, the storage dispenser unit 10 includes temperature control, e.g., heating or cooling elements, to avoid extremes of temperature to further promote and maintain the freshness of the stored food ingredient.

Flour has been described herein as an exemplary ingredient, but the foregoing apparatus is applicable for the storage and dispensing of virtually any granular or fluid substance. Among food preparation ingredients, the present apparatus is useful for storage and dispensing of flour, sugar, baking powder, baking soda, just to name a few. There are additionally applications outside the kitchen where the precise dispensing of bulk material, preferably by weight, would be desirable.

In particular, an embodiment is contemplated wherein a plurality of ingredients are stored and selectively dispensed. This is particularly applicable to spices and flavorings, or other ingredients that are typically used in smaller quantities than flour, sugar, or the like. Accordingly, the size of storage necessary for convenient and usage of such small-quantity ingredients is reduced. Plural ingredients may be stored separately in a single unit that is not excessive in size. The user may select the ingredient to be dispensed along with the quantity via keypad 28. Stored recipes consisting of several ingredients may be included or user-input for added convenience as well. The measures to enhance shelf-life discussed above are equally applicable to the plural-ingredient embodiment.

In a further embodiment of the present disclosure, a precision measuring dispenser is a precision measuring converter and output device for dry goods such as flours and grains or other granular substances. One of its primary purposes are to eliminate the need for measuring cups or guesswork between units of measurement. The PMD uses the same amount of counter space (e.g., footprint) as a standard canister, has an added feature of adjustable height to collapse into the same overall space as a conventional canister of similar volume. Is also expends vertically to accommodate bowls of various sizes.

An internal scale converts cups to grams, in addition to other conversions. A digital display shows introduced and converted amounts; interchangeable canisters can be reserved and stored according to their contents. An internal processor displays the contents of each interchangeable canister, aiding in proper dispensing and conversion. A vacuum seal on the canister allows for long-term storage.

An air-sealed chamber dispenses directly into a bowl or vessel of choice. The PMD can be used to measure and store various types of flours or grains. The PMD may be battery, solar or cord-powered.

Figure 3:
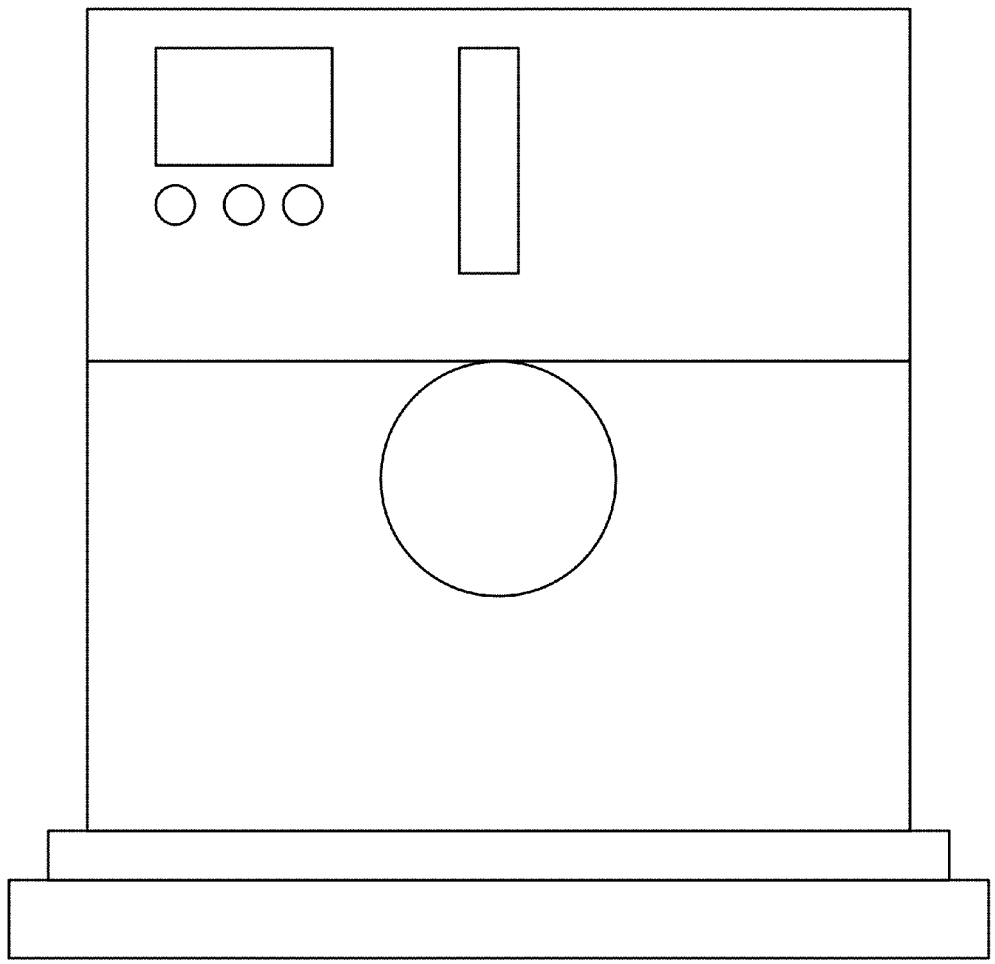
FIG. 3 illustrates an alternate embodiment of the present disclosure having a screw-feed dispenser.

An upper part comprises an interchangeable storage/input container which slides vertically and is held in place with a ratcheting mechanism; Hinged feed-door in top; Window gauge or optionally a transparent or translucent canister; LCD readout; Control buttons for conversion of cups-to-gram, ounces-to-grams, pounds-to-grams, grams-to-ounces, gram-to-pounds, and other calculations including internal calculations executed to convert a requested volumetric quantity of material to a corresponding mass; Processor and scale inside upper housing which surrounds the storage/input container; Cylinder with airlock and feed-screw; Supporting middle section; Output base with optional separable output vessel. See FIG. 3

In the function of this further embodiment, A bowl or other container is placed on the PMD's output base. The PMD is adjusted to the height of the output container. Flour or other dry granular substance is poured into top of the container. A window gauge shows the amount inside. Using the control buttons, the user enters the amount desired and the output measurement desired. The processor calculates the output and a LCD readout shows the exact amount to be dispensed, in the target measurement, and dispenses the amount into the bowl in the output base.

Figure 4:
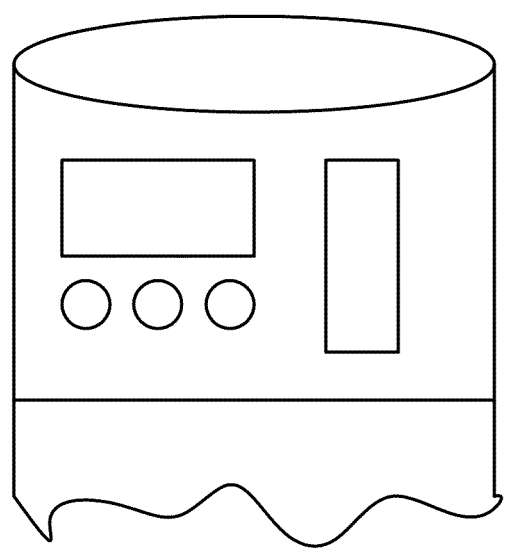
FIG. 4 illustrates an upper storage container portion of the embodiment shown in FIG. 3.
Figure 5:
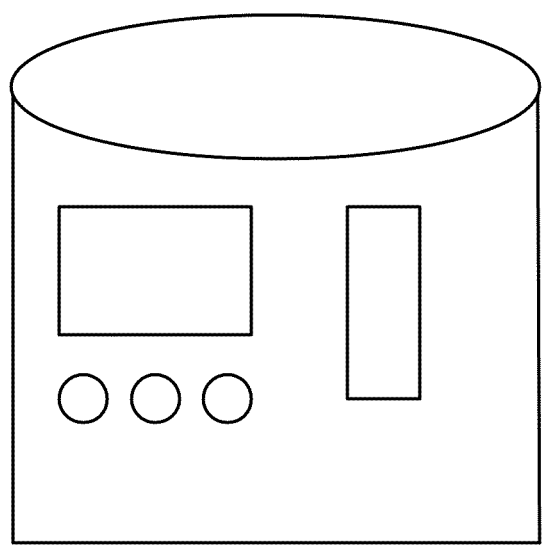
FIG. 5 illustrates a view of the control buttons associated with the embodiment of FIG. 3.
Figure 6:
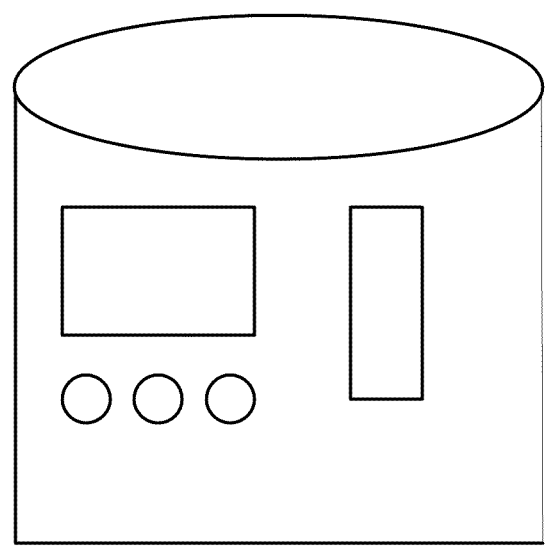
FIG. 6 illustrates a view of the display associated with the embodiment of FIG. 3.
Figure 7:
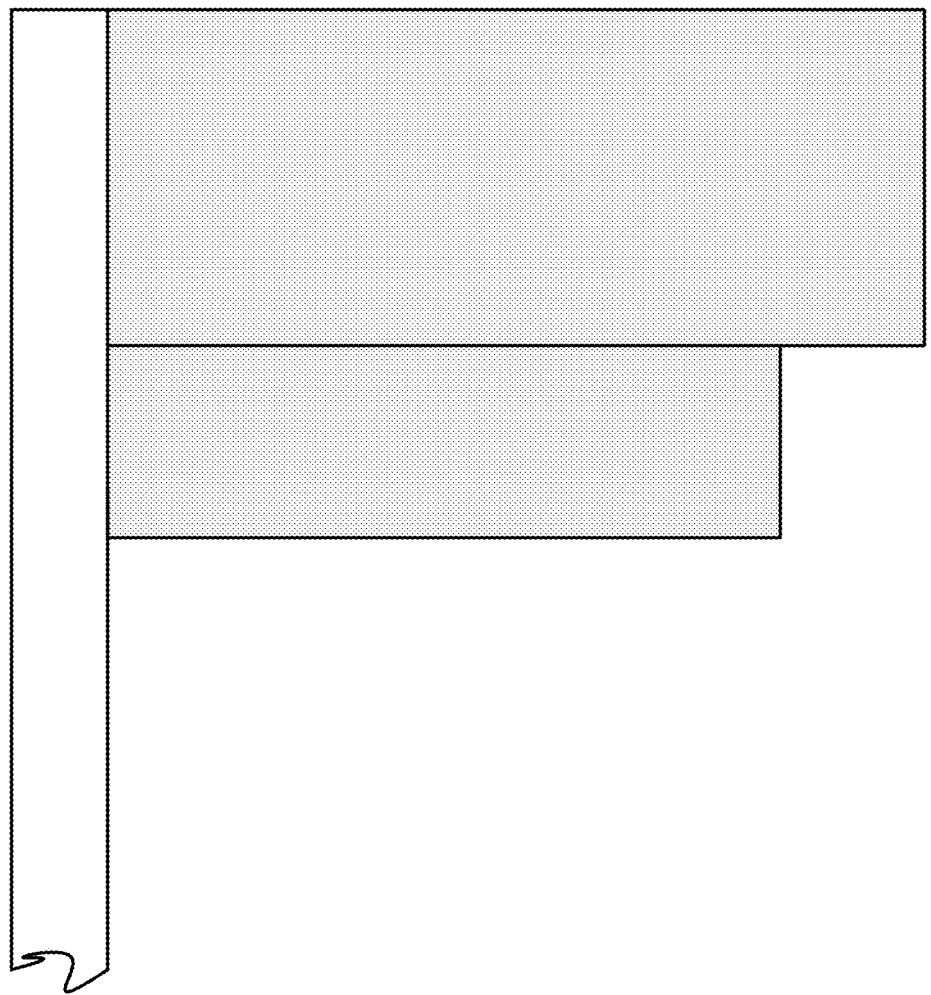
FIG. 7 illustrates a detailed side elevation view of the airlock and screw feed associated with the embodiment of FIG. 3.
Figure 8:
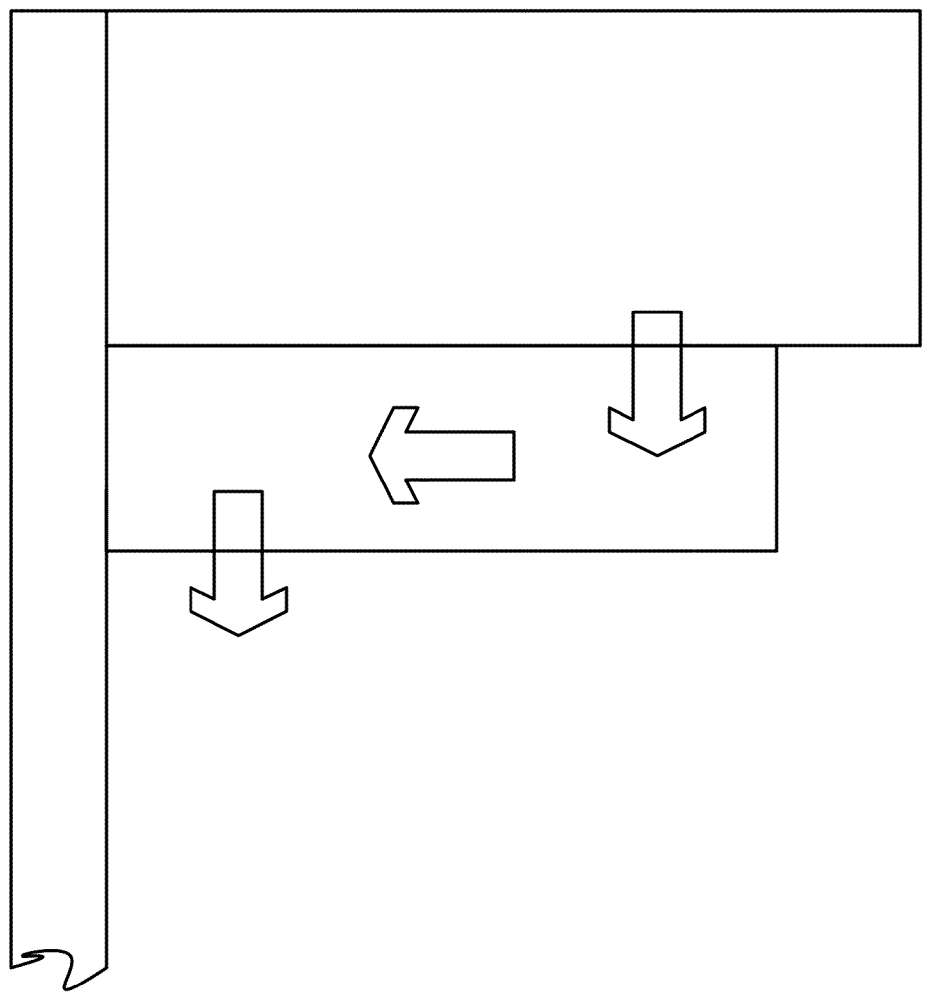
FIG. 8 illustrates a perspective view of the a view of the airlock and screw feed associated with the embodiment of FIG. 3.

The user pours the substance to be measured into the input container (FIG. 4). Using the control buttons on the container cylinder (FIG. 5), the user enters the desired output amounts (for example, 1 cup). The calculator inside the unit's upper part (not pictured—internal) computes the output in the desired measurement and displays that in the LCD readout (FIG. 6). At that point the door of the inner airlock chamber (FIG. 7) opens to receive the granular substance and the feed screw (FIG. 8) turns to fill the cylinder.

The airlock chamber rotates so that the door faces downward and the first part of the substance is delivered. The airlock chamber rotates to receive more of the granular substance (if necessary), and the feed screw continues in the other direction, pushing more of the substance into the cylinder (FIG. 9). The airlock chamber rotates again, repeating the process while the feed screw continues moving in alternate directions to quickly fill the airlock chamber. Thus the airlock chamber works fluidly with the feed screw to alternately receive and expel the substance until the desired amount is finally deposited. This cycle repeats until desired weight is subtracted from the storage container. The feed screw is capable of measuring out accurate measurements down to 0.125 oz.

The remaining granular substance in the container can then be further meted out, or it can be stored, optionally after re-establishment of a vacuum seal within the storage container. An internal switchboard gives the user ability to assign each storage/input container to a particular ingredient. The storage/input container slides on and off the unit vertically and can be interchanged with other containers for ease of cleaning and measuring of differing materials.

In the present embodiment, the following material selections are contemplated, though others may be used. The upper part with an interchangeable input container—ABS plastic. Hinged feed-door—transparent polycarbonate. Window gauge—transparent polycarbonate. LCD readout—per component supplier/manufacturer; Control buttons—ABS plastic; Processor and scale—per component supplier/manufacturer; Cylinder with airlock—transparent polycarbonate; Feed-screw—transparent polycarbonate, however some ingredients may require stainless steel; Supporting middle section—ABS plastic; Output base —ABS plastic.

With the shape and size of this particular product, injection molding would be the choice of manufacturing. Injection molding is the most commonly practiced plastic processing method in the plastics industry. This process can produce all different shapes and sizes of plastic products, and can produce the most complex of plastic parts. Injection molding uses force to push plastic into a cold steel mold to form the part being produced.

In order to reduce the manufacturing and retail price of the product, we contemplate constructing a simpler interchangeable storage/input container without parts such as scale, processor and readout. Reserving these parts for only the non interchangeable base unit would reduce retail costs for units with multiple storage containers. The storage containers would retain the optional vacuum seal upon removal from the PMD. This would result in a base unit with incorporated scale, motor, processor and LCD readout. The base unit and processor would receive information as to the contents of a particular container from the interchangeable container, and the processor would direct the dispensing section accordingly.

Humidity control is contemplated for the present PMD, notwithstanding the implied cost of an associated compressor and refrigeration unit for condensing and removing humidity. As an alternative cooling unit a heat pipe may be employed, similar to those used in computer-processor cooling, notwithstanding the cost.

Although the present disclosure has been described in relation to particular embodiments thereof, many other variations and modifications and other uses will become apparent to those skilled in the art. It is preferred, therefore, that the present disclosure be limited not by the specific disclosure herein.

What is claimed is:

1. A storage dispenser unit comprising:
   a canister having a plurality of storage compartments therein for receiving and holding quantities of material to be dispensed;
   a dispensing section operatively connected with the canister for receiving a quantity of material from one of the plurality of storage compartments of the canister and for dispensing the material from the dispensing section;
   an electronic controller having an input section for receiving data and an output section for directing the operation of the dispensing section; and
   a keypad for data entry to the electronic controller,
   wherein:
      the input section of the electronic controller is configured to receive data from the keypad indicating a type of ingredient of the material and a desired quantity of material to be dispensed expressed in volumetric units,
      a processor of the electronic controller is configured to convert the desired volumetric units of the type of ingredient to corresponding mass units of material to be dispensed, and
      the output section of the controller is configured to output a control signal to the dispensing unit to cause the dispensing unit to dispense the desired quantity of material by mass.

2. The storage dispenser unit according to claim 1, further comprising a scale for weighing material dispensed by the dispensing section, the scale being operative to provide feedback to the controller for monitoring the quantity of material dispensed from the dispensing section.

3. The storage dispenser unit according to claim 1, further comprising a display operatively connected with the electronic controller.

4. The storage dispenser unit according to claim 1, wherein the dispensing section comprises a screw feed apparatus.

5. The storage dispenser unit according to claim 1, further comprising an electronic storage operative to store volumetric unit to mass unit conversion factors for one or more of the types of ingredients of the materials to be dispensed, wherein the processor accesses the electronic storage in directing operation of the dispensing section.

6. The storage dispenser unit according to claim 1, wherein the canister is configured to be interchangeable.

7. The storage dispenser unit according to claim 5, wherein the electronic storage is further operative to store at least one recipe consisting of a plurality of ingredients and corresponding amounts of the ingredients to be dispensed.

8. A storage dispenser unit comprising:
   a canister having a storage compartment therein for receiving and holding a quantity of material to be dispensed;
   a vacuum pump operatively connected to the canister to draw a vacuum on the material in a storage compartment;

a dispensing section operatively connected with the canister for receiving a quantity of material from the storage compartment of the canister and for dispensing the material from the dispensing section;

an electronic controller having an input section for receiving data and an output section for directing the operation of the dispensing section; and a keypad for data entry to the electronic controller, wherein:

the input section of the electronic controller is configured to receive data from the keypad indicating a type of ingredient of the material and a desired quantity of material to be dispensed expressed in volumetric units, a processor of the electronic controller is configured to convert the desired volumetric units of the type of ingredient to corresponding mass units of material to be dispensed, and the output section of the controller is configured to output a control signal to the dispensing unit to cause the dispensing unit to dispense the desired quantity of material by mass.

9. The storage dispenser unit according to claim 1, further comprising a transparent portion of the canister for viewing the materials in the storage compartments.

10. A storage dispenser unit comprising:

a canister having a plurality of storage compartments therein for receiving and holding quantities of a plurality of materials to be dispensed;

a dispensing section operatively connected with the canister for receiving a quantity of material from at least one of the storage compartments of the canister and for dispensing the material from the dispensing section;

an electronic controller having an input section for receiving data and an output section for directing the operation of the dispensing section;

a scale for weighing material dispensed by the dispensing section, the scale being operative to provide feedback to the controller for monitoring a quantity of material dispensed from the dispensing section;

an electronic storage operative to store volumetric unit to mass unit conversion factors for each of the types of ingredients of the materials to be dispensed; and a keypad for data entry to the electronic controller, wherein:

the input section of the electronic controller is configured to receive data from the keypad indicating a selected type of ingredient from among the plurality of materials and a desired quantity of the selected material to be dispensed expressed in volumetric units, a processor of the electronic controller is configured to convert the desired volumetric units of the type of ingredient to a corresponding mass of selected material to be dispensed, wherein the processor accesses the electronic storage in directing operation of the dispensing section, and the output section of the controller is configured to output a control signal to the dispensing unit to cause the dispensing unit to dispense the desired quantity of selected material by mass.

11. The storage dispenser unit according to claim 10, wherein the electronic storage is further operative to store at least one recipe consisting of a plurality of ingredients and corresponding amounts of the ingredients to be dispensed.

12. The storage dispenser unit according to claim 10, further comprising a vacuum pump operatively connected to the canister to draw a vacuum on the material in the storage compartments.

13. The storage dispenser unit according to claim 10, further comprising a transparent portion of the canister for viewing the material in the storage compartments.

14. The storage dispenser unit according to claim 10, further comprising a display operatively connected with the electronic controller.

15. The storage dispenser unit according to claim 10, wherein the dispensing section comprises a screw feed apparatus.

16. The storage dispenser unit according to claim 10, wherein the canister is configured to be interchangeable.

* * * * *